(12) United States Patent
Tutunaru

(10) Patent No.: US 9,960,648 B2
(45) Date of Patent: May 1, 2018

(54) ADJUSTABLE HIGH TORQUE AXIAL GAP ELECTRIC MOTOR

(71) Applicant: Catalin Tutunaru, Cape Elizabeth, ME (US)

(72) Inventor: Catalin Tutunaru, Cape Elizabeth, ME (US)

(73) Assignee: H&D Electrics, LLC, Baltimore, MD (US)

( * ) Notice: Subject to any disclaimer, the term of this patent is extended or adjusted under 35 U.S.C. 154(b) by 26 days.

(21) Appl. No.: 15/319,425

(22) PCT Filed: Jun. 19, 2015

(86) PCT No.: PCT/US2015/036579
§ 371 (c)(1),
(2) Date: Dec. 16, 2016

(87) PCT Pub. No.: WO2015/200104
PCT Pub. Date: Dec. 30, 2015

(65) Prior Publication Data
US 2017/0141631 A1    May 18, 2017

Related U.S. Application Data

(60) Provisional application No. 62/015,452, filed on Jun. 22, 2014.

(51) Int. Cl.
| | |
|---|---|
| *H02K 21/26* | (2006.01) |
| *H02K 1/27* | (2006.01) |
| *H02K 1/17* | (2006.01) |
| *H02K 1/18* | (2006.01) |
| *H02K 1/02* | (2006.01) |

(52) U.S. Cl.
CPC ............ *H02K 1/2793* (2013.01); *H02K 1/02* (2013.01); *H02K 1/17* (2013.01); *H02K 1/182* (2013.01)

(58) Field of Classification Search
CPC ........ H02K 1/2793; H02K 1/17; H02K 1/182; H02K 1/02
USPC .............. 310/266, 267, 268, 156.01–156.84, 310/154.01
See application file for complete search history.

(56) References Cited

U.S. PATENT DOCUMENTS

| | | | | |
|---|---|---|---|---|
| 7,791,246 B2* | 9/2010 | Okazaki | ............... | H02K 19/103 310/268 |
| 8,110,955 B2* | 2/2012 | Ries | .................... | F16C 32/0408 310/156.64 |
| 8,193,671 B2* | 6/2012 | Okamoto | ............... | H02K 21/04 310/154.06 |
| 2011/0278965 A1* | 11/2011 | Kang | .................... | H02K 1/146 310/44 |

* cited by examiner

*Primary Examiner* — Hanh Nguyen
(74) *Attorney, Agent, or Firm* — Law Offices of Daniel A. Tesler, LLC

(57) ABSTRACT

A high torque axial gap electric motor includes rotor and stator disks containing magnets fixed to their respective faces, where the magnets contain triangular ridges arranged in concentric circles. The face of each rotor magnet ridge is parallel to the face of a stator magnet ridge, creating an air gap with a cross-section that has a zigzag appearance. The preferred embodiment uses a three-phase motor design with multiple rotors and stators and permanent magnets.

7 Claims, 6 Drawing Sheets

ADJUSTABLE HIGH TORQUE AXIAL GAP ELECTRIC MOTOR

CROSS REFERENCE TO RELATED APPLICATIONS

This application claims the benefit of U.S. Provisional Patent Application No. 62/015,452 filed Jun. 22, 2014, which is hereby incorporated by reference in its entirety.

FIELD OF THE INVENTION

The present invention relates to electric motors, in particular, to axial gap electric motors.

BACKGROUND OF THE INVENTION

Over the years, many variations on the electric motor have been used to convert electrical energy into mechanical energy. Despite these many variations, there exists a need for an electric motor with an adjustable amount of torque to suit particular applications. In particular, there is a need for an electric motor that provides a larger amount of torque without increasing the size or weight of the motor. This type of high torque motor would be useful in a variety of applications, including electric vehicles.

One type of electric motor in use today is the axial gap or pancake motor. An axial gap motor uses one or more disk shaped stators fixed to a frame and one or more disk shaped rotors angularly fixed to an output shaft. This design allows the motor to be more compact than radial gap electric motors. Axial gap motors are self-centering due to the magnetic field generated between the rotor disk and stator disk, making them suited for high speed rotation. However, there is a need for an electric motor that benefits from the compact size of axial gap motors, but produces more torque at a low RPM.

Accordingly, it is an object of the present invention to provide an axial gap motor with an increased amount of torque at low RPMs without increasing the size or weight of the motor. It is also an object of the present invention to provide a means of adjusting the torque output of the motor to suit different applications.

BRIEF SUMMARY OF THE INVENTION

The present invention provides an electric motor comprising a support assembly fixed to two stator disks and three rotor disks angularly fixed to an output shaft. The stator disks comprise a flat non-magnetic disk, windings for three phases and permanent magnets mounted on the flat surfaces of the stator. The rotor disks comprise a flat non-magnetic disk with permanent magnets fixed to each flat surface that faces a stator disk. The permanent magnets mounted on the rotor are shaped with two peaks when a cross section of the magnet is viewed. The permanent magnets mounted to the stator are shaped with two valleys that correspond to the peaks on the rotor magnets in a cross sectional view. The resultant air gap between the rotor and stator magnets has a cross section with a zigzag appearance.

The invention has application to electric motors in general and would be particularly beneficial when used in applications requiring a compact motor with high torque at low RPMs, such as in an electric or hybrid vehicle. Such vehicles require large amounts of torque to accelerate from a stop, but also benefit from the reduced power consumption of a low RPM electric motor. The invention is also applicable in low torque applications because it is capable of producing higher amounts of horsepower and torque than other electric motors of a similar size and weight.

In the invention is an axial gap electric motor comprising a first, second and third disk shaped rotor angularly fixed to an output shaft and a first and second disk shaped stator fixed to a support assembly. The first stator is positioned between the first and second rotors and the second stator is positioned between the second and third rotors. Each rotor face that directly opposes a stator face contains a circular array of permanent magnets with two concentric ridges. Both faces of each stator contain three phases of windings with a permanent magnet affixed to both faces of the stator for each winding. The permanent magnets fixed to the stator faces contain three concentric ridges that correspond to the ridges in the rotor magnets. The preferred embodiment disclosed herein uses three rotors and two stators, however, it is to be understood that rotors and stators may be added or subtracted to optimize the invention for a particular application.

DETAILED DESCRIPTION OF THE INVENTION

Figure 1:
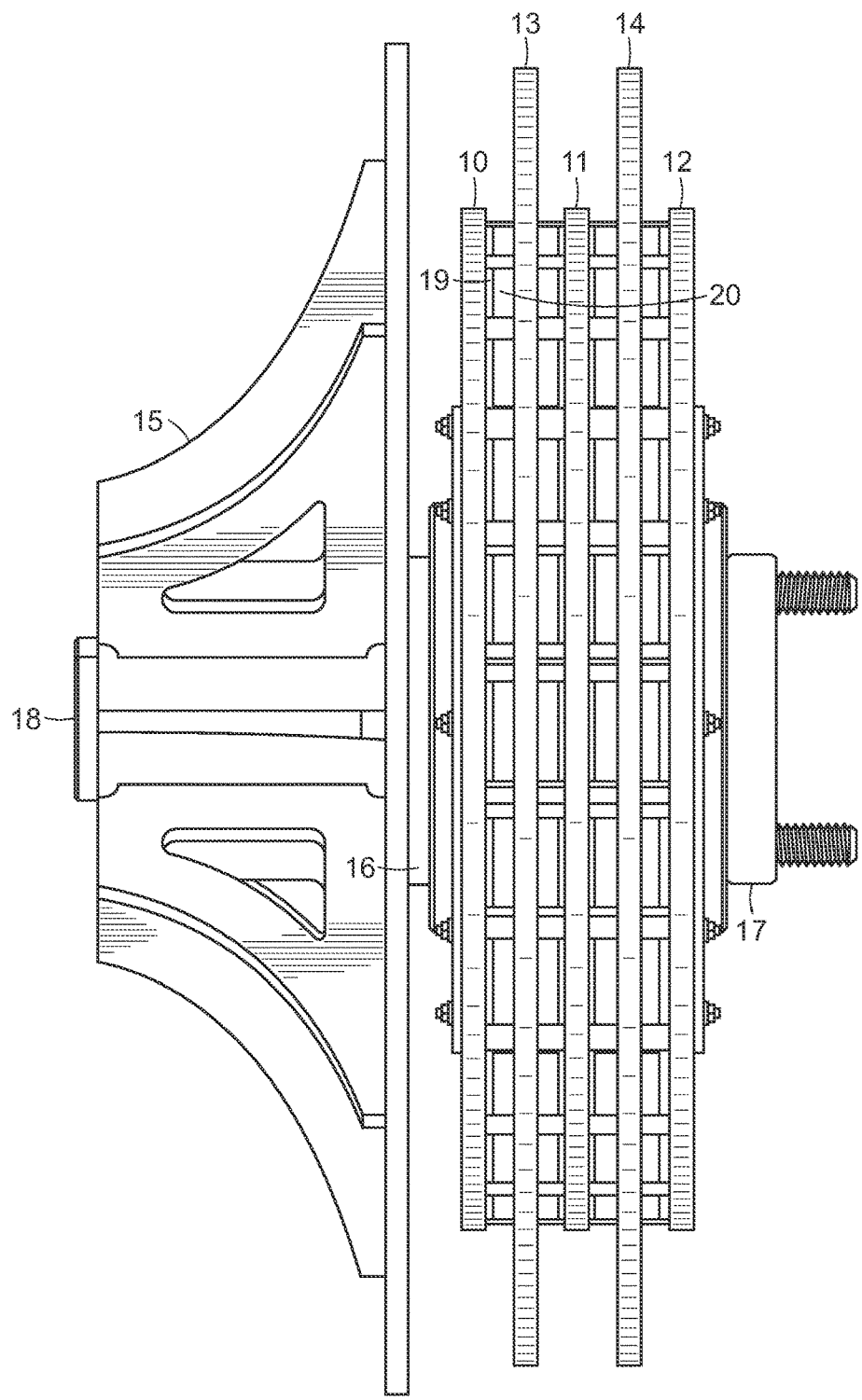
FIG. 1 is a side view of the invention with the dust cover removed.

In FIG. 1, is a side view of the invention comprising a first rotor 10, a second rotor 11, a third rotor 12, a first stator 13, a second stator 14, a support structure 15, a first bearing 16, a second bearing 17 and an output shaft 18. Each rotor and stator is disk shaped with two flat opposing faces and is constructed from a non-magnetic material. Permanent magnets with two ridges (rotor magnets) 19 are affixed to each rotor face opposite a stator face and arranged in a circle about the axis of rotation. The rotor magnets 19 are preferably Neodymium N50 magnets, a strong rare earth magnet. While N50 magnets represent the preferred embodiment, other types of magnets may be substituted depending on the torque output needed from the motor. The rotor magnets 19 can be mounted using fasteners or an adhesive.

Figure 2:
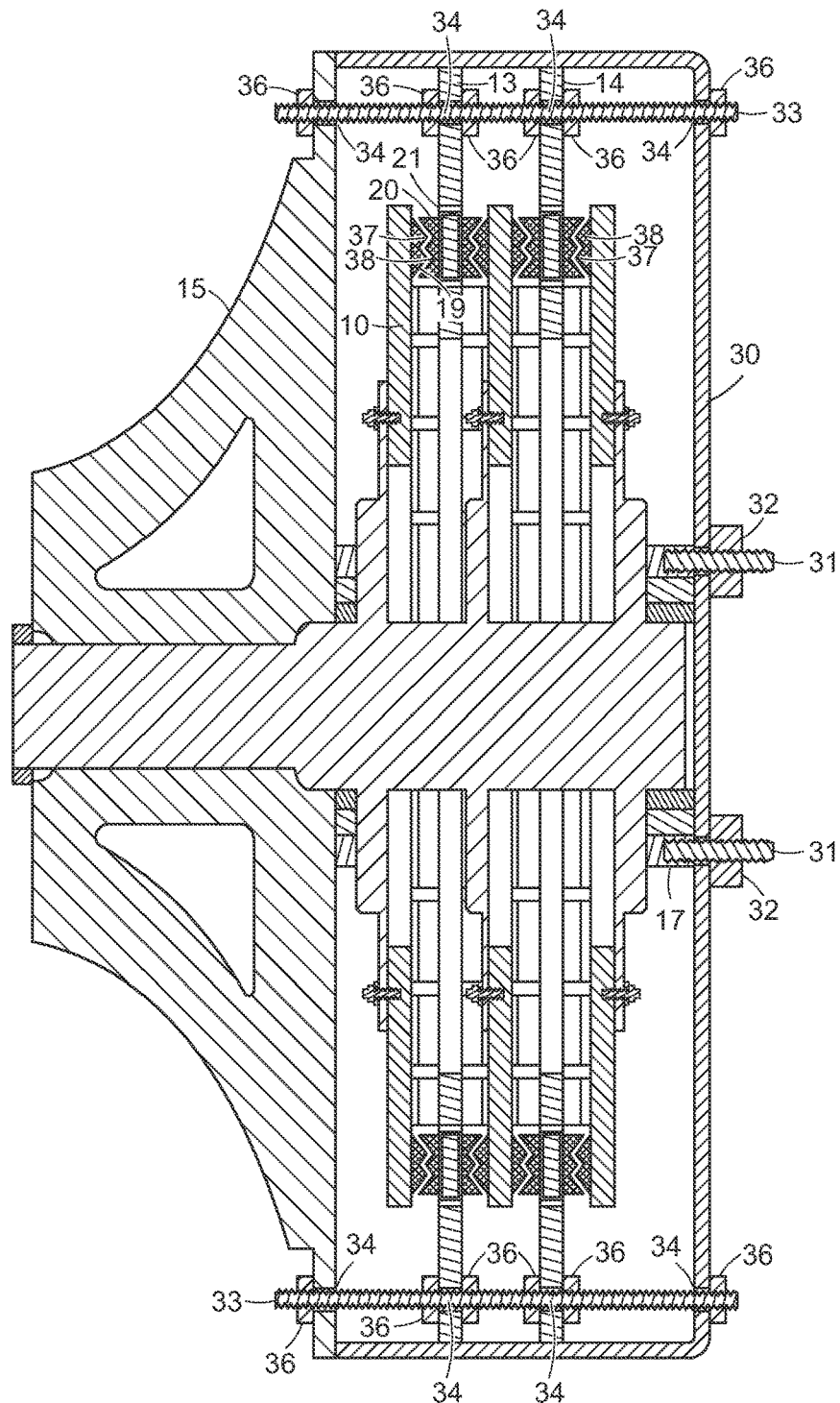
FIG. 2 is a sectioned side view of the invention with the dust cover installed.

In FIG. 2 is a sectioned side view of the invention shown with a dust cover 30 installed. As seen in this view, the stator contains windings 21 comprising wire wrapped through the stator disk. There are three phases of windings in the preferred embodiment. Each winding 21 is recessed into a groove on the face of each stator and a stator magnet 20 is affixed to each winding. The stator magnets can be made of the same classes of magnetic material as the rotor magnets. The stator magnets can be mounted to the face of the stators using fasteners or adhesives as well, however the stator magnets must have a low resistance electrical connection to its corresponding winding 21.

The dust cover 30 is attached to studs 31 that are attached to the outer ring of bearing 17 using nuts 32. Extending from the inside of the dust cover 30 are eight fully threaded rods 33. The rods 33 pass through smooth circular openings 34 in the stators 13 and 14, the cover 30 and the support structure 15. Each rod 33 is fixed to the dust cover 30 on one end with a nut 36 and fixed to the support structure 15 at its opposite end using a nut 36. The stators 13 and 14 are fixed to the rod 33 using nuts 36 tightened on either side of the respective stator.

The sectioned side view of FIG. 2 shows the cross section of the rotor magnets 19, the stator magnets 20 and the air gap between them. The peaks 37 on the rotor magnets correspond to the valleys 38 in the stator magnets. The distance in the axial direction between the peaks 37 and the valleys 38 is between 1.2 and 3.0 mm in the preferred embodiment. Increasing the axial distance within these parameters increases the torque output of the motor and reducing the axial distance within these parameters decreases the torque output of the motor. It is understood that this particular range of distances is applicable only to the preferred embodiment, which uses a rotor of approximately 354 mm in diameter. The range in axial distances that are appropriate for a particular motor depend on the size of the motor, the strength of the magnet used and the angle of the peaks and valleys in the rotor and stator magnets respectively.

Figure 3:
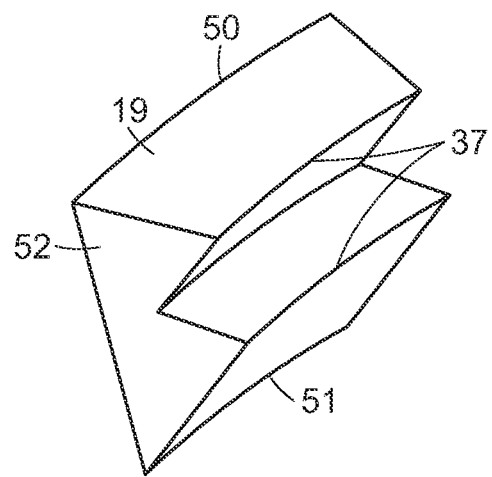
FIG. 3 is a perspective view of a rotor magnet.
Figure 4:
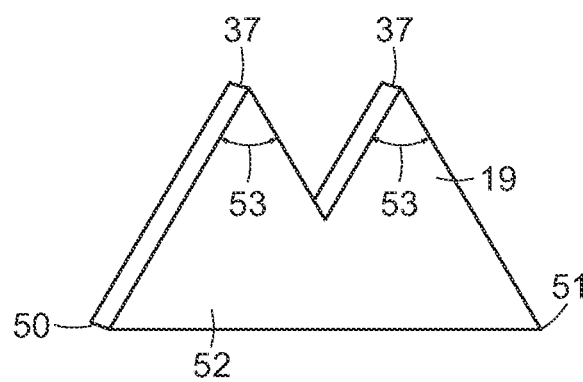
FIG. 4 is a side view of a rotor magnet.
Figure 5:
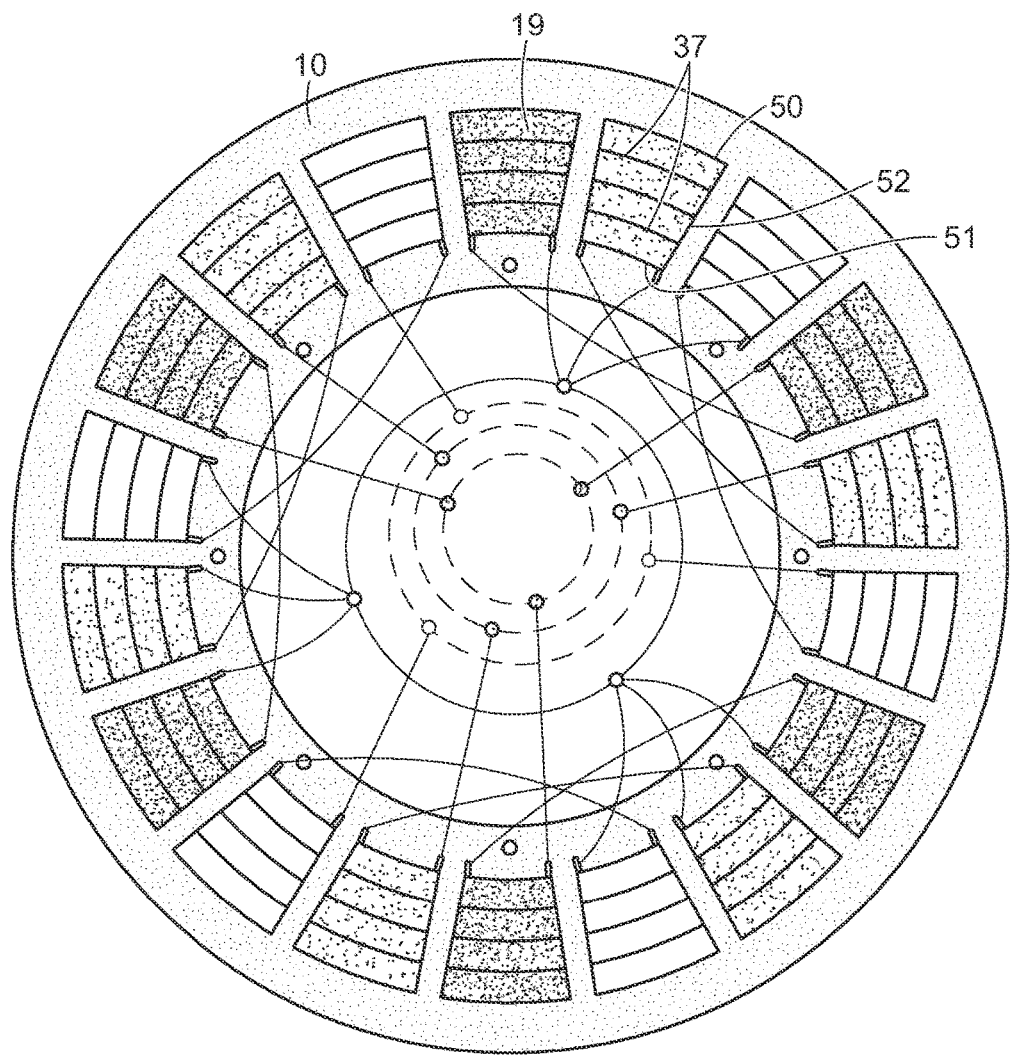
FIG. 5 is a front view of a rotor showing the magnet arrangement on the rotor face.

FIGS. 3, 4 and 5 show the rotor magnets 19 and their arrangement on stator 10 in detail. While only one rotor is shown in this FIG. 5, it is understood that rotors 11 and 12 use an identical arrangement of magnets.

FIG. 3 shows a perspective view of a single rotor magnet 19. The top edge of the rotor magnet 50 and bottom edge of the rotor magnet 51 are curved about the axis of the rotor. The peaks 37 are likewise curved about the axis of the rotor. The sides of the rotor magnets 52 are flat and perpendicular to the rotor surface and taper together towards the bottom edge of the rotor magnet 51. Therefore the top edge of the rotor magnet 50 is longer than the bottom edge of the rotor magnet 51.

FIG. 4 shows a side view of a single rotor magnet. The peaks 37 have an angle 53. Changing the angle of the peaks adjusts the magnetic flux. The angle of the peaks 53 can be in the range of 20° to 36°. Within this range, increasing the angle increases the torque output of the motor. In the preferred embodiment, the angle 53 is 30°. FIG. 5 shows the rotor magnets 19 mounted on rotor 10.

Figure 6:
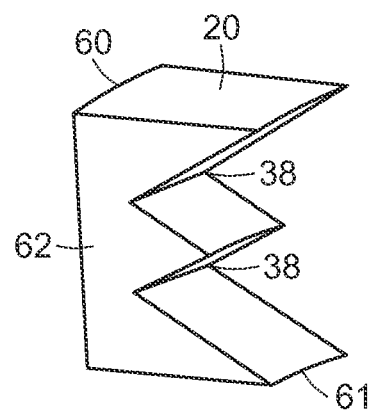
FIG. 6 is a perspective view of a stator magnet.
Figure 7:
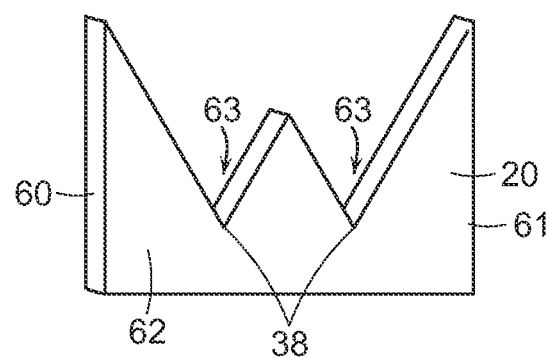
FIG. 7 is a side view of a stator magnet.
Figure 8:
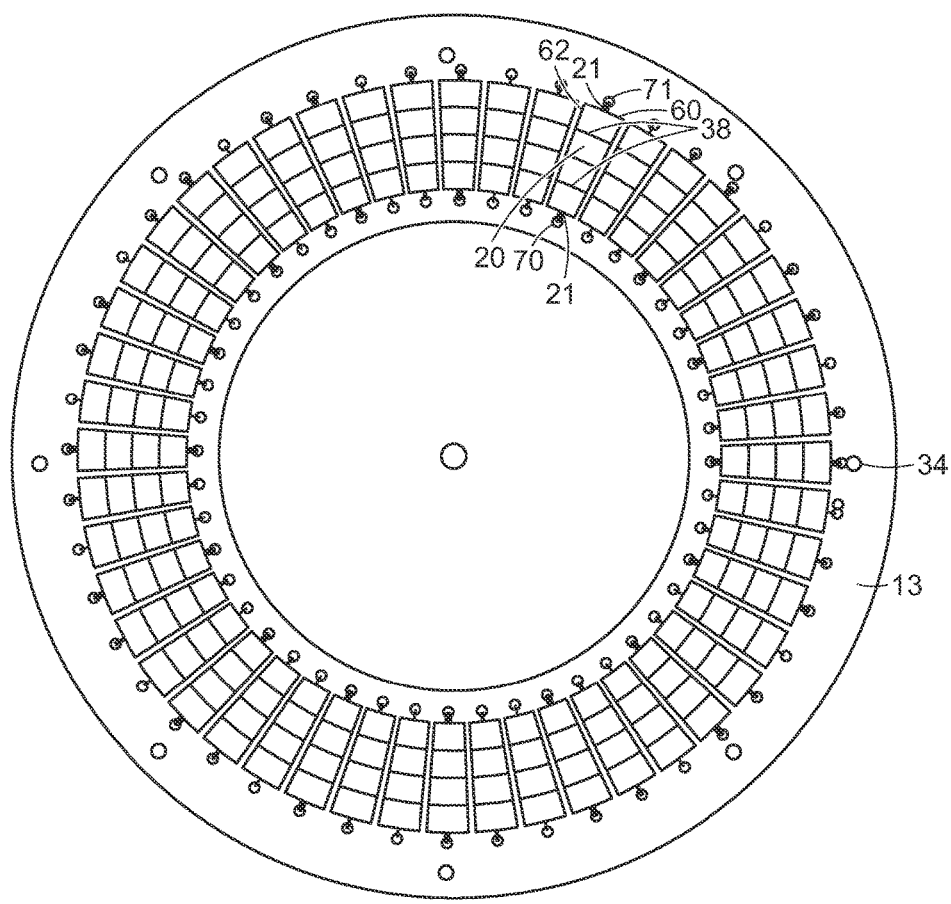
FIG. 8 is a front view of a stator showing the magnet and windings arrangement on the stator face.

FIGS. 6, 7, and 8 show the stator magnets 20 and their arrangement on stator 13. While only one side of stator 13 is shown, it is understood that the opposite side of stator 13 and both sides of stator 14 use an identical arrangement of magnets.

In FIG. 6, the top edge of the stator magnet 60 and bottom edge of the stator magnet 61 are curved about the axis of the stator. The valleys 38 are likewise curved about the axis of the stator. The curvature of the top edge of the stator magnet 60, the bottom edge of the stator magnet 61 and the valleys 38 are identical to the curvature of the top edge of the rotor magnet 50, bottom edge of the rotor magnet 51 and peaks 37 respectively. The sides of the stator magnets 62 are flat and perpendicular to the stator surface and taper together towards the bottom edge of the stator magnet 61. Therefore, the top edge of the stator magnet 60 is longer than the bottom edge of the stator magnet 61.

In FIG. 7, the angle 63 of the valleys 38 is equal to the angle 53 of the peaks 37 in the rotor magnets 19 in FIG. 4. In the preferred embodiment, the angle 63 is 30°.

FIG. 8 shows the stator magnets 20 arranged on the stator 13. The windings 21 pass through an inner opening 70 and an outer opening 71 on the stator. Each winding 21 has a stator magnet 20 mounted above so that the winding 21 is pressed between the back of the stator magnet 20 and the face of stator 13. The preferred embodiment uses a three phase design so that there are three stator magnets for each rotor magnet.

What has been described is an electric motor for the conversion of electrical energy to mechanical energy. It is well known in the art that electric motors can alternatively be used as generators, converting mechanical energy into electrical energy. While this disclosure shows the invention as an electric motor, it is also capable of being used as a generator. In this disclosure, there are shown and described only the preferred embodiments of the invention, but, as aforementioned, it is to be understood that the invention is capable of use in various other combinations and environments and is capable of changes or modifications within the scope of the inventive concept as expressed herein.

The invention claimed is:

1. An electric motor comprising:
   a disk shaped rotor having a first face and a second face, angularly fixed to an output shaft;
   a disk shaped stator having a first face and a second face fixed to a support assembly;
   said second face of said rotor oriented towards and parallel to said first face of said stator;
   one or more bearings mounted between said output shaft and said support assembly, allowing said rotor and output shaft to rotate independently of said support assembly;
   a multitude of rotor magnets having a flat side mounted to said second face of said rotor and a ridged side of one or more triangular cross-section ridges opposite said flat side;
   a multitude of stator magnets with a flat side mounted to said first face of said stator and a ridged side of two or more triangular cross-section ridges opposite said flat side, said ridged side oriented so that the surface of said stator magnet ridges are parallel to the surface of said rotor magnet ridges.

2. The electric motor of claim 1 where said ridged side of said rotor magnets comprises two triangular cross-section ridges arranged in concentric circles from the axis of said output shaft.

3. The electric motor of claim 2 where said ridged side of said stator magnets comprises three triangular cross-section ridges arranged in concentric circles from the axis of said output shaft.

4. The electric motor of claim 3 where said ridged side of said rotor magnets comprises flat surfaces with an angle between 20 and 36 degrees to an adjacent flat surface.

5. The electric motor of claim 3 where said ridged side of said rotor magnets comprises flat surfaces with an angle of 30 degrees to an adjacent flat surface.

6. The electric motor of claim 5 where said rotor magnets comprise Neodymium.

7. The electric motor of claim 6 where said stator magnets comprise Neodymium.

* * * * *